US010958920B2

(12) United States Patent
Su et al.

(10) Patent No.: US 10,958,920 B2
(45) Date of Patent: Mar. 23, 2021

(54) SINGLE-CHANNEL INVERSE MAPPING FOR IMAGE/VIDEO PROCESSING

(71) Applicant: Dolby Laboratories Licensing Corporation, San Francisco, CA (US)

(72) Inventors: Guan-Ming Su, Fremont, CA (US); Tao Chen, Palo Alto, CA (US); Qian Chen, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/630,520

(22) PCT Filed: Jul. 24, 2018

(86) PCT No.: PCT/US2018/043441
§ 371 (c)(1),
(2) Date: Jan. 13, 2020

(87) PCT Pub. No.: WO2019/023202
PCT Pub. Date: Jan. 31, 2019

(65) Prior Publication Data
US 2020/0169742 A1 May 28, 2020

Related U.S. Application Data

(60) Provisional application No. 62/536,215, filed on Jul. 24, 2017.

(30) Foreign Application Priority Data

Jul. 24, 2017 (EP) .................................... 17182722

(51) Int. Cl.
*H04N 19/30* (2014.01)
*H04N 19/186* (2014.01)
(Continued)

(52) U.S. Cl.
CPC ........... *H04N 19/30* (2014.11); *H04N 19/186* (2014.11); *H04N 19/1887* (2014.11); *H04N 19/70* (2014.11)

(58) Field of Classification Search
CPC .. H04N 19/30; H04N 19/186; H04N 19/1887; H04N 19/70
See application file for complete search history.

(56) References Cited

U.S. PATENT DOCUMENTS 9,936,199 B2   4/2018 Froehlich
10,264,287 B2*  4/2019 Wen ...................... H04N 19/46
(Continued)

FOREIGN PATENT DOCUMENTS

WO    2016153896    9/2016
WO    2017015397    1/2017

OTHER PUBLICATIONS

IRU-R BT. 2100 "Image Parameter Values for High Dynamic Range Television for Use in Production and International Programme Exchange" ITU, Jul. 2016.

(Continued)

*Primary Examiner* — Jared Walker

(57) ABSTRACT

In some embodiments, an encoder device is disclosed to generate single-channel standard dynamic range/high dynamic range content predictors. The device receives a standard dynamic range image content and a representation of a high dynamic range image content. The device determines a first mapping function to map the standard dynamic range image content to the high dynamic range image content. The device generates a single channel prediction metadata based on the first mapping function, such that a decoder device can subsequently render a predicted high dynamic range image content by applying the metadata to (Continued)

transform the standard dynamic range image content to the predicted high definition image content.

13 Claims, 14 Drawing Sheets

(51) Int. Cl.
*H04N 19/169* (2014.01)
*H04N 19/70* (2014.01)

(56) References Cited

U.S. PATENT DOCUMENTS

| | | | | |
|---|---|---|---|---|
| 2013/0314495 | A1* | 11/2013 | Chen | H04N 19/33 |
| | | | | 348/43 |
| 2014/0044372 | A1* | 2/2014 | Mertens | H04N 19/98 |
| | | | | 382/248 |
| 2014/0050271 | A1* | 2/2014 | Su | H04N 19/186 |
| | | | | 375/240.26 |

OTHER PUBLICATIONS

ITU-R BT.1886 "Reference Electro-Optical Transfer Function for Flat Panel Displays Used in HDTV Studio Production" p. 1-7.
Jung C. et al "CE2-Related: Adaptive Quantization-Based HDR Video Coding with HEVC Main 10 Profile" JCT-VC Meeting: Feb. 19-26, 2016, San Diego. pp. 1-3.
SMPTE ST 2084:2014 "High Dynamic Range Electro-Optical Transfer Function of Mastering Reference Displays".

* cited by examiner

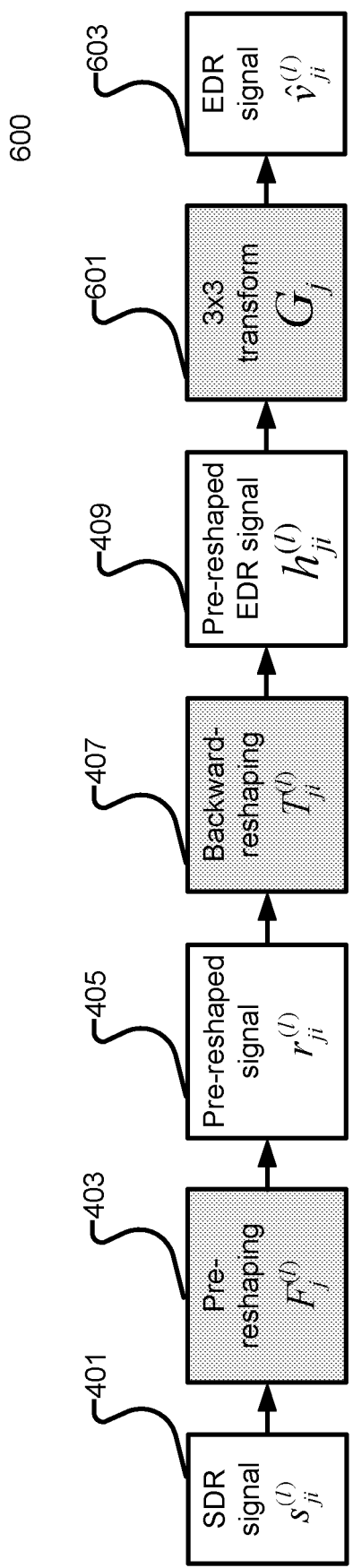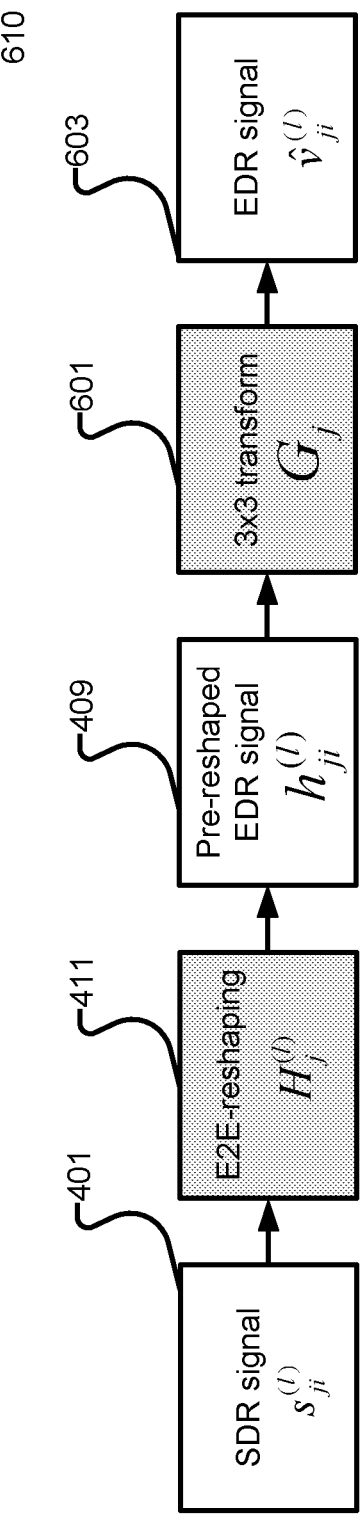
FIG. 6A
FIG. 6B

US 10,958,920 B2

SINGLE-CHANNEL INVERSE MAPPING FOR IMAGE/VIDEO PROCESSING

CROSS REFERENCE TO RELATED APPLICATIONS

This application claims benefit of the U.S. Provisional Application No. 62/536,215 and European Patent Application No. 17182722.3, both filed on Jul. 24, 2017 and are incorporated by reference each in its entirety.

TECHNICAL FIELD

The present disclosure relates generally to image/video. More particularly, the present disclosure relates to image/video processing.

BACKGROUND

As used herein, the term "dynamic range" (DR) may relate to a capability of the human visual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus, while perhaps somewhat narrower in relation to true scene referred HDR, EDR nonetheless represents a wide DR breadth and may also be referred to as HDR. As used herein, the term "iDM" (short for inverse display-mapped signal), may also refer to EDR or HDR signals that were created based on an input standard dynamic range (SDR) signal.

In practice, images comprise one or more color components (e.g., luma Y and chroma Cb and Cr), where each color component is represented by a precision of n-bits per pixel (e.g., n=8). Using linear luminance coding, images where n<8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 cd/m$^2$ or nits. Most consumer HDTVs range from 300 to 500 nits with new models reaching 1000 nits (cd/m$^2$). Such displays thus typify a lower dynamic range (LDR), also referred to as a standard dynamic range (SDR), in relation to HDR or EDR. HDR content may be displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084: 2014 "High Dynamic Range EOTF of Mastering Reference Displays," which is incorporated herein by reference in its entirety. In general, without limitation, the methods of the present disclosure relate to any dynamic range higher than SDR.

BRIEF DESCRIPTION OF THE DRAWINGS

The present embodiments are illustrated by way of example and not limitation in the figures of the accompanying drawings in which like references indicate similar elements.

FIGS. 6A and 6B show an exemplary process of a transformation from SDR to predicted EDR according to one embodiment.

DESCRIPTION OF EXAMPLE EMBODIMENTS

Figure 1:
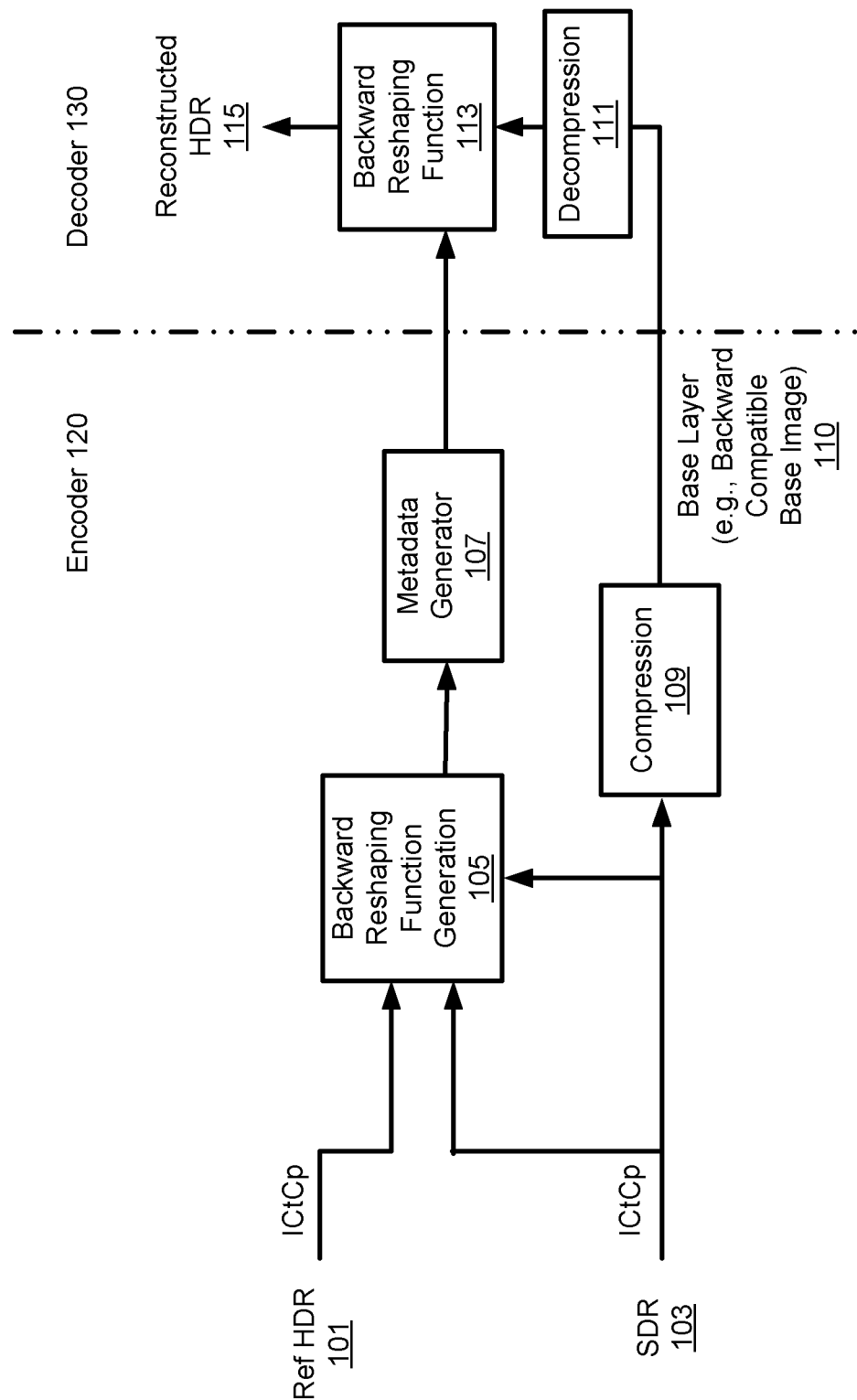
FIG. 1 shows an example block diagram of a video encoder/decoder according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

As used herein, the term "PDF", or simply histogram refers to probability distribution function. "CDF" refers to cumulative distribution function. SDR or HDR histogram may be constructed based on a distribution of codewords in one or more of the SDR or HDR images respectively. "Codeword" refers to a sequence of bit information to represent a color pixel. For example, '00000000' may represent pixel color black for an 8-bit codeword. "Codeword bin" or "bin" refers to a particular codeword in a predefined sequence or set of codewords. The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In one embodiment, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays," which is incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model.

For example, under SMPTE ST 2084, at 1 cd/m2, one 12-bit code value or codeword corresponds to a relative change of approximately 0.0048 cd/m2; however, at 1,000 cd/m2, one 12-bit code value or codeword corresponds to a relative change of approximately 2.24 cd/m2. This nonlinear quantization is needed to accommodate for the non-linear contrast sensitivity of the human visual system (HVS).

According to some embodiments, methods and systems for generating single-channel prediction metadata to render a predicted HDR image from an SDR image is disclosed. Said prediction metadata can subsequently be used by a decoder to render the predicted HDR image by using the single channel prediction metadata to reconstruct a backward reshaping function for transforming at least one color channel of the SDR image to a corresponding at least one color channel of the predicted HDR image.

In a first embodiment, a system receives image content in both an SDR representation and HDR representation. The system accesses a pre-reshaping function for scaling the at least one color channel of the SDR representation. The system applies the pre-reshaping function to the at least one color channel of the SDR representation to obtain at least one pre-reshaped color channel for transmission to the decoder. The system determines a first mapping function for mapping input codewords to output codewords. First and second CDFs are generated that represent the cumulative distribution of codewords of the at least one color channel of the SDR representation and the cumulative distribution of codewords of the corresponding at least one color channel of the HDR representation, respectively, wherein the first and second CDFs associate each codeword with a corresponding CDF value. Cumulative distribution function matching is applied based on the first and the second CDFs, comprising matching each codeword of the first CDF to a codeword of the second CDF that has a CDF value that matches the CDF value of said codeword of the first CDF, wherein the codewords of the first CDF define the input codewords of the first mapping function and the matched codewords of the second CDF define the output codewords of the first mapping function. The system determines the backward reshaping function by function decomposition of $H=T(F(b))$, wherein H represents the determined first mapping function, T represents the backward reshaping function to be determined by the decomposition, F represents the pre-reshaping function and b represents input of the pre-reshaping function. The system generates the single channel prediction metadata representative of the backward reshaping function.

In a second embodiment, a system receives image content in both an SDR representation and HDR representation. The system accesses a pre-reshaping function for scaling the at least one color channel of the SDR representation. The system applies the pre-reshaping function to the at least one color channel of the SDR representation to obtain at least one pre-reshaped color channel for transmission to the decoder. The system determines a first mapping function for mapping input codewords to output codewords. First and second CDFs are generated that represent the cumulative distribution of codewords of the at least one pre-reshaped color channel and the cumulative distribution of codewords of the corresponding at least one color channel of the HDR representation, respectively, wherein the first and second CDFs associate each codeword with a corresponding CDF value. Cumulative distribution function matching is applied based on the first and the second CDFs, comprising matching each codeword of the first CDF to a codeword of the second CDF that has a CDF value that matches the CDF value of said codeword of the first CDF, wherein the codewords of the first CDF define the input codewords of the first mapping function and the matched codewords of the second CDF define the output codewords of the first mapping function. The system determines the backward reshaping function based on the first mapping function. The system generates the single channel prediction metadata representative of the backward reshaping function.

As used herein, the term "reshaping" refers to a pre-processing operation on an HDR image, such as scaling, quantization, and the like, to map it from its original bit depth to an image of a lower or the same bit depth, to allow for more efficient coding using existing coding standards and devices. "Backward reshaping" is used to describe a mapping or pre-processing operation from SDR to HDR. As appreciated by the inventors here, improved techniques for encoding and decoding video data that can be used to support display capabilities of a wide variety of SDR and HDR display and/or decoder devices are desired.

Single-Channel Architecture without Pre-Reshaping

FIG. 1 shows an example block diagram of an image/video encoder/decoder according to one embodiment. Referring to FIG. 1, encoder 120 includes backward reshaping function generator 105, metadata generator 107, and compression 109. In one embodiment, the encoder 120 can be a set of one or more data processing systems that generate metadata (e.g., by using metadata generator 107) and create compressed content (e.g., by using compression 109), and the encoder 120 can be part of a transmission system that transmits the metadata and compressed content or can be coupled to such transmission system to allow the transmission system to receive and possibly store and transmit the metadata and compressed content. Decoder 130 includes decompression 111 and backward reshaping function 113. The decoder 130 can be part of a data processing system that is a consumer electronic device such as a smartphone, or tablet computer, or gaming system, etc. The decoder 130 can receive the transmission of the compressed content and metadata through a variety of different ways (such as, streaming media through the internet or a set of one or more files that are stored on the consumer electronic devices, etc.). In one embodiment, the metadata is generated on a per scene basis such that each scene (in the two formats of ref HDR 101 and SDR 103) has its own set of metadata; in another embodiment, the metadata can be generated on a per image basis such that each image (such as the same image in both formats ref HDR 101 and SDR 103) has its own set of metadata. Generator 105 can determine backward reshaping functions or mapping functions to transform a SDR into a reference HDR. Metadata generator 107 can generate metadata based on the mapping or backward reshaping functions. Compression 109 can compress a SDR based on a codec scheme to generate a base layer signal (such as base layer 110) for transmission. Decompression 111 can decompress a base layer signal. Decoder 130 can use the metadata to construct a backward reshaping function 113 for application to a decompressed base layer signal to generate a predicted EDR.

For example, referring to FIG. 1, to encoder a signal, encoder 120 may receive SDR 103 and Ref HDR 101. The received SDR 103 and ref HDR 101 may be in a general intermediate color space, such as RGB color space. In one embodiment, the ref HDR 101 can be derived or generated from the SDR 103 or can be created separately from the SDR 103. SDR 103 and ref HDR 101 can be converted into a compatible color space, such as an ICtCp color space before they are received by backward reshaping functions generator or generator 105. Generator 105 generates single-channel predictors (e.g., backward reshaping functions with no cross-color channels) based on SDR 103 (e.g., SDR image content) and Ref HDR 101 (e.g., a representation of HDR image content). Metadata generator 107 generates metadata based on the single-channel predictor mapping functions for transmission to a decoder, such as decoder 130. Compression 109 compresses SDR 103 based on a codec scheme to generate base layer signal 110. The compressed signal or base layer 110 is transmitted to a decoder, such as decoder 130. Decoder 130 receives the metadata and the base layer signal 110. Decompression 111 decompresses signal 110 based on a codec scheme to reconstruct a SDR signal. Backward reshaping function 113 receives the decompressed signal and applies the single channel predictor functions to the SDR to generate or reconstruct a HDR signal.

Cumulative Distribution Function (CDF)-Based Histogram Approximation

In one embodiment, generator 105 generates the single-channel predictors by CDF matching. Let $s_{ji}^{(l)}$ be the ith pixel value at the jth image (or frame) in the lth color plane in the SDR data, and $v_{ji}^{(l)}$ be the ith pixel value at jth image (or frame) in the lth color plane in the reference HDR (or EDR or iDM) data. Let the number of pixels be $P^{(l)}$ for the lth channel in each frame. Note that owing to different chroma formats, (e.g., 4:2:0, 4:2:2, 4:4:4), luma and chroma might have different number of pixels. Let the bit depth in the SDR be SDR_bitdepth, such that the number of possible value in SDR is $N_S = 2^{SDR\_bitdepth}$. Let the bit depth in the EDR be IDM_bitdepth, the number of possible value in HDR is $N_E = 2^{IDM\_bitdepth}$. Note the minimal and maximal value within jth frame at iDM image as $v_j^{(l),L}$ and $v_j^{(l),H}$ in IPT or ITP(e.g., ICtCp) domain. Note the minimal and maximal value within jth frame at SDR image as $s_j^{(l),L}$ and $s_j^{(l),H}$ in IPT or ITP domain.

Let the histogram/PDF for SDR and iDM be $h_{jb}^{(l),s}$ and $h_{jb}^{(l),v}$ for the lth channel, respectively, where b is the bin index. Let the cumulative distribution function (CDF) for SDR and iDM be $c_{jb}^{(l),s}$ and $c_{jb}^{(l),v}$ respectively for the lth channel. The CDF can be calculated from PDF by applying cumulative sum operation on the PDF. Let the CDF matching operation be $CDFM(\{h_{jb}^{(l),s}\}, \{h_{jb}^{(l),v}\})$. Let $T_{j,b}^{(l)}$ (or $T_j^{(l)}$ for entire range) be the backward reshaping function which maps a SDR picture to an iDM picture.

Table 1 below illustrates an example detailed algorithm for obtaining a histogram transfer function used to map a histogram of one or more SDR images to a histogram of one or more target HDR images that correspond to the one or more SDR images, which histogram transfer function can be used as a backward reshaping function for downstream devices to backward reshape the SDR images to predicted HDR images that closely approximate the target HDR images.

TABLE 1

```
// For each color channel l,
// STEP 1: initialization
h_jb^(l),s = 0 for b = 0, . . . , 2^SDR_bitdepth −1
h_jb^(l),v = 0 for b = 0, . . . , 2^iDM_bitdepth −1
c_jb^(l),s = 0 for b = −1, . . . , 2^SDR_bitdepth −1
c_jb^(l),v = 0 for b = −1, . . . , 2^iDM_bitdepth −1
// STEP 2: scan for each pixel in SDR to build PDF
for ( i = 0 ; i < P^(l) ; i ++ )

h^(l),s_{j,s_ji^(l)} ++;          // histogram for SDR h^(l),v_{j,v_ji^(l)} ++;          // histogram for iDM end
// STEP 3A: build CDF for SDR
for( b = 0 : b < Ns; b ++ )
    c_{j,b}^(l),s = c_{j,b−1}^(l),s + h_{jb}^(l),s
end
// STEP 3B: build CDF for iDM
for( b = 0 : b < N_E; b ++ )
    c_{j,b}^(l),v = c_{j,b−1}^(l),v + h_{jb}^(l),v
end
// STEP 4A: normalize SDR CDF to between [0 1]
for( b = 0 ; b < Ns; b ++ )
```

TABLE 1-continued $$c_{j,b}^{(l),s} = \frac{c_{j,b}^{(l),s}}{p(l)}$$

end
// step 4B: normalize iDRM CDF to between [0 1]
for( b = 0 : b < $N_E$; b ++ )

$$c_{j,b}^{(l),v} = \frac{c_{j,b}^{(l),v}}{p(l)}$$

end
// STEP 5: histogram transfer
for( b = 0 ; b < Ns; b ++ )
   // for each SDR sample point, find the corresponding CDF value
   // find the iDM whose CDF cover the SDR CFG.
   find k such that $c_{j,k-1}^{(l),v} \leq c_{j,b}^{(l),s} \leq c_{j,k}^{(l),v}$
   // find the iDM sample points
   perform interpolation based on $c_{j,k-1}^{(l),v}$ and $c_{j,k}^{(l),v}$ $$T_{j,b}^{(l)} = (k-1) + \frac{c_{j,b}^{(l),s} - c_{j,k-1}^{(l),v}}{c_{j,k}^{(l),v} - c_{j,k-1}^{(l),v}}$$

end
// STEP 6: curve clipping
for( b= 0; b <= $s_j^L$; b++ )
   $T_{j,b}^{(l)} = v_j^L$
end
for( b= $s_j^H$ +1; b < N; b++ )
   $T_{j,b}^{(l)} = v_j^H$
end
// STEP 7: curve smoothing $$T_{j,b}^{(l)} = \frac{1}{2W+1} \sum_{k=b-W}^{b+W} T_{j,k}^{(l)}$$

// STEP 8:rounding and clipping
   $T_{j,b}^{(l)} = \text{clip3}(\text{round}(T_{j,b}^{(l)}), 0, N_s - 1)$ In one embodiment, for each SDR and EDR pair of images or scenes (which can be the same image or scene in the two formats), for each of the color channels, generator 105 generates a single-channel predictor. In one embodiment, a single-channel predictor is a mapping function or backward reshaping function. In another embodiment, a backward reshaping function is a lookup table (LUT). In another embodiment, generator 105 generates single-channel predictors for each frame (or image) of a video. In some embodiments, backward reshaping data (e.g., analytical functions, non-analytical functions, lookup tables, sequences, etc.) that defines or specifies the backward reshaping function $\{T_{j,b}\}$ can be included as a part of image metadata delivered to downstream devices along with the SDR image.

In some embodiments, a set of polynomial pieces (e.g., representing an 8-piece $2^{nd}$ order polynomial, etc.) may be used to represent the backward reshaping function $\{T_{j,b}\}$ for a luma channel. In some embodiments, a second set of polynomial pieces (e.g., representing an 4-piece $2^{nd}$ order polynomial, etc.) may be used to represent chroma channels. In some embodiments, backward reshaping metadata includes polynomial coefficients, pivots, offsets, etc., that define the set of polynomial pieces can be included as a part of image metadata delivered to downstream devices along with the SDR image.

A downstream device that receives the SDR image and the backward reshaping metadata may use the backward reshaping metadata to determine or reconstruct the backward reshaping function on a per scene basis (when the metadata is on a per scene basis) or on a per image basis (when the metadata is on a per image basis). The backward reshaping function can then be applied to the SDR image to reconstruct an HDR image.

Figure 2A:
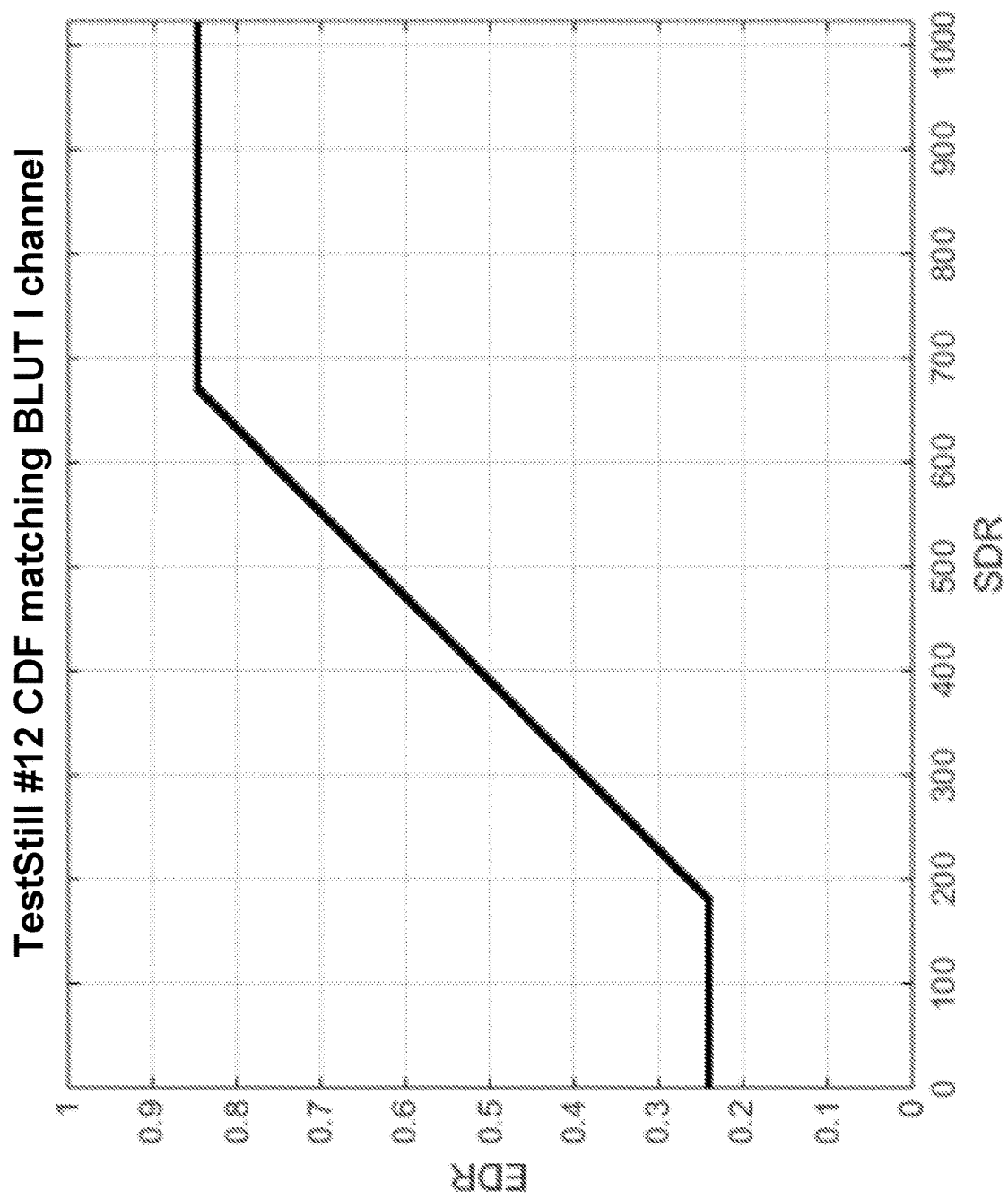
FIGS. 2A, 2B and 2C illustrate exemplary inverse mapping functions of SDR/EDR in ICtCp color space for an image.
Figure 2B:
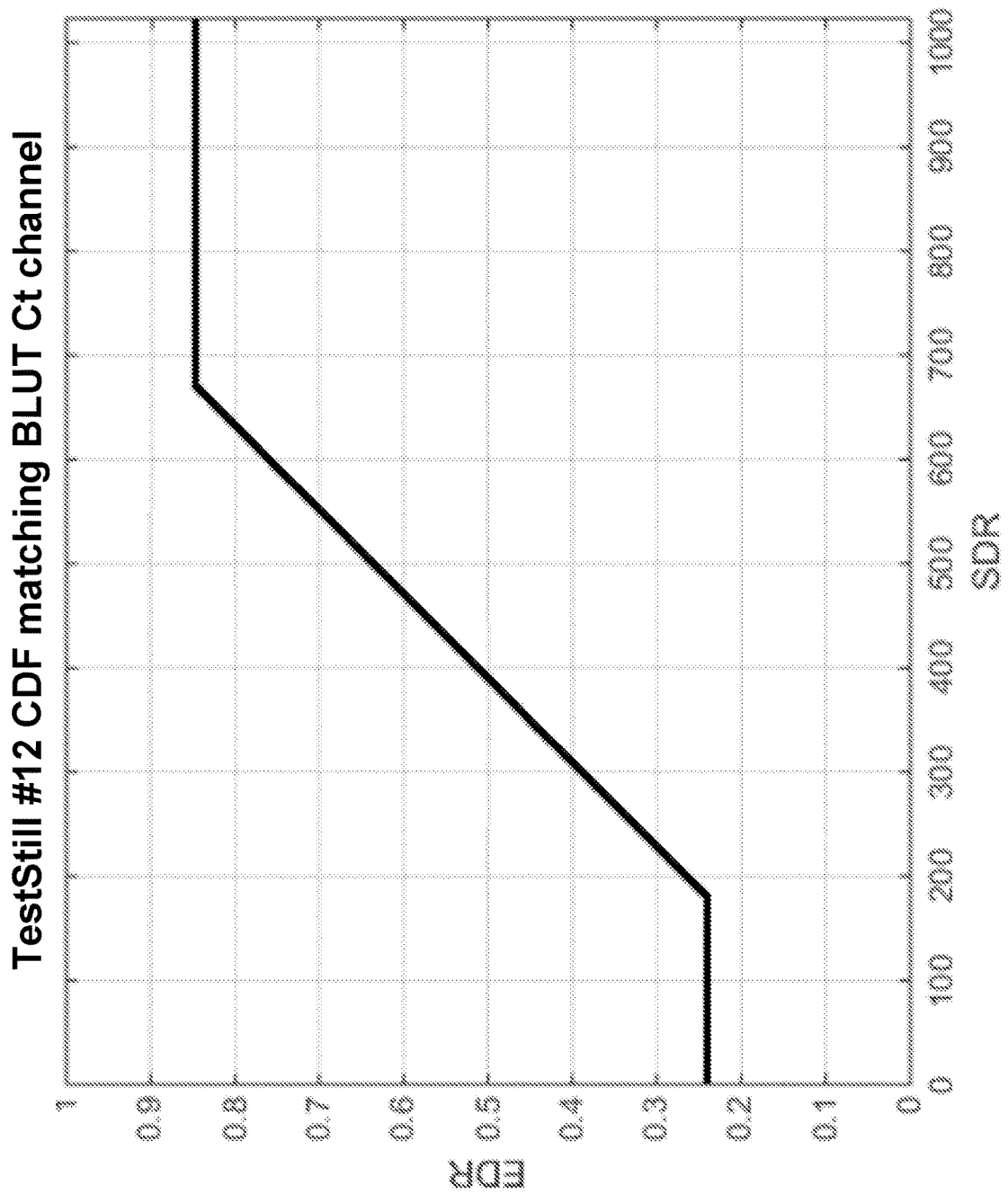
Figure 2C:
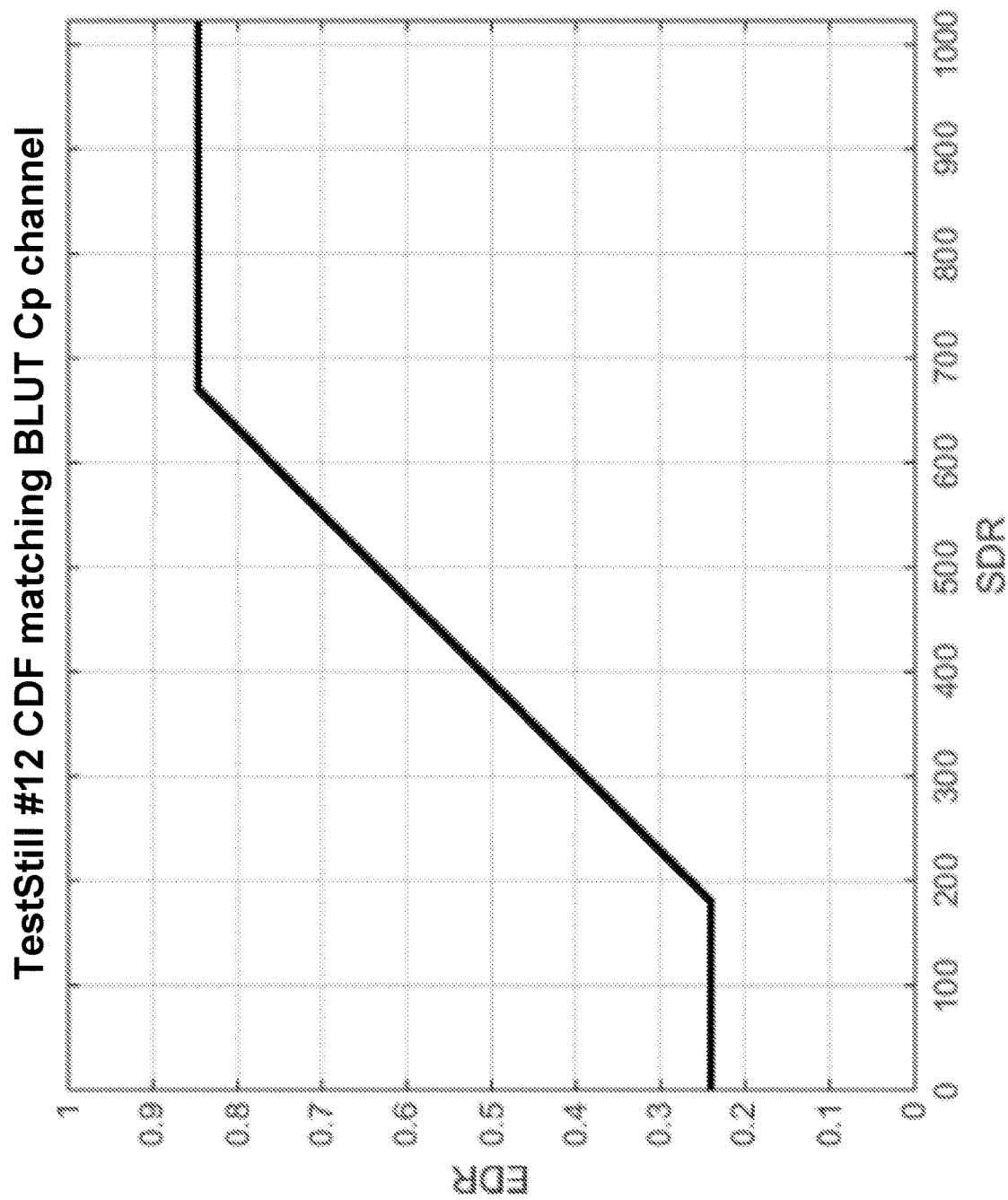

FIGS. 2A-2C illustrate exemplary inverse mapping functions (or single-channel predictors) for SDR and EDR in the ICtCp color space for an image. A description of ICtCp, also to be referred herein as the ITP color space, may be found in Rec. ITU-R BT. 2100 (07/2016), "*Image parameter values for high dynamic range television for use in production and international programme exchange,*" which is incorporated herein by reference. Referring to FIGS. 2A-2C, from the inverse mapping functions, color channels I, Ct, and Cp are plotted for a TestStill image. In one embodiment, each color channel (I, CT, or Cp) can be approximated by a single-channel predictor. In one embodiment, each single-channel predictor corresponds to a lookup table that can be derived from the corresponding inverse mapping function for the particular color channel. The inverse mapping functions or backward reshaping functions can be generated by a backward reshaping function generator such as generator 105 of FIG. 1. The inverse mapping functions or backward reshaping functions may be reduced to lookup tables or mapping tables having SDR/HDR pairs to map a SDR codeword to a HDR codeword, or vice versa. In another embodiment, a metadata is generated based on the lookup table or mapping table such that the metadata can be transmitted along with the SDR data to downstream decoders. Downstream decoders can reconstruct an HDR image from the metadata and a corresponding SDR image. In another embodiment, when EDR images are not available, static reshaping functions or static lookup tables can be generated by aggregating histograms for each color channel of a sample of pictures within a database. The aggregated histograms can then be used as the input iDM histograms for CDF-based histogram approximation as described in Table 1 to generate backward reshaping functions or static lookup tables for SDR image(s). A metadata can then be generated from the static lookup tables. The metadata can be applied to corresponding SDR image(s) to reconstruct an HDR image.

Single-Channel Architecture with Pre-Reshaping

SDR can be directly encoded in IPT or ITP color space. However, it is well known that existing codecs cannot encode IPT or ITP signals well. Furthermore, SDR signal is only 100 nits in intensity of visible light, which occupies about 50% of available PQ codewords. I.e., baseband quantization has significant loss (1 bit loss). The coding efficiency thus degrades and there is a greater chance of banding artifact generation by directly encoding in ICtCp color space. To overcome these inefficiencies, SDR signal is pre-reshaped by a pre-reshaping module such that the pre-reshaped signal can be codec friendly and can improve coding efficiency.

Figure 3A:
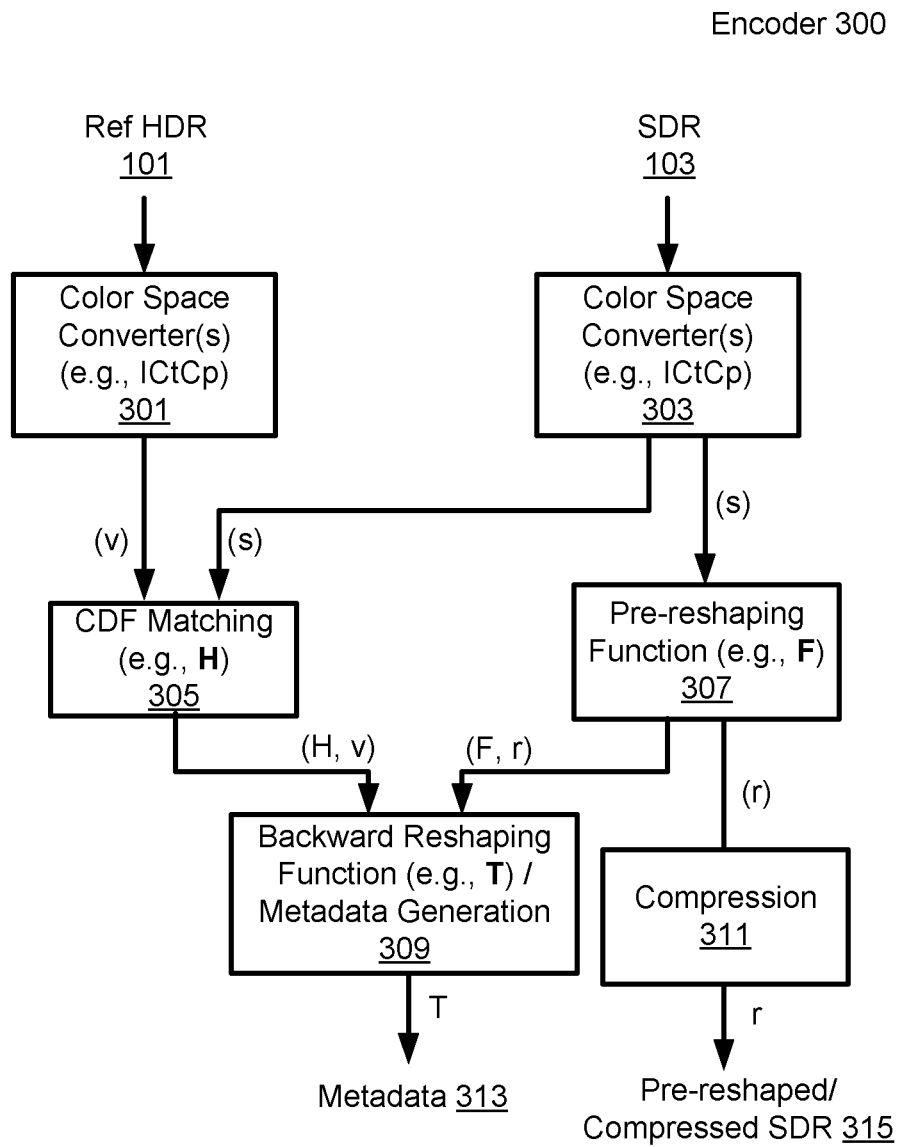
FIG. 3A shows a block diagram of an encoder according to one embodiment.

FIG. 3A shows a block diagram of an encoder according to one embodiment. Encoder 300 may be based on encoder 120 of FIG. 1 with the modification shown in FIG. 3A. Encoder 300 includes color space converters 301-303, CDF matching 305, pre-reshaping function 307, backward reshaping function/metadata generator 309, and compression 311. Color space converters 301-303 can convert input images (or frames) from one color space to another such as a predetermined color space, e.g., ICtCp color space. CDF matching 305 receives two inputs (e.g., SDR and HDR) and can determine mapping functions to transform SDR to HDR. Pre-reshaping function 307 can pre-reshape an SDR signal. Backward reshaping function/metadata generator 309 can generate a backward reshaping function and a corresponding metadata (e.g., metadata 313) for transmission to a downstream decoder. Compression 311 can compress a SDR based on a codec scheme to generate a base layer signal (e.g., pre-reshaped/compressed SDR 315) for transmission to a downstream decoder.

Figure 3B:
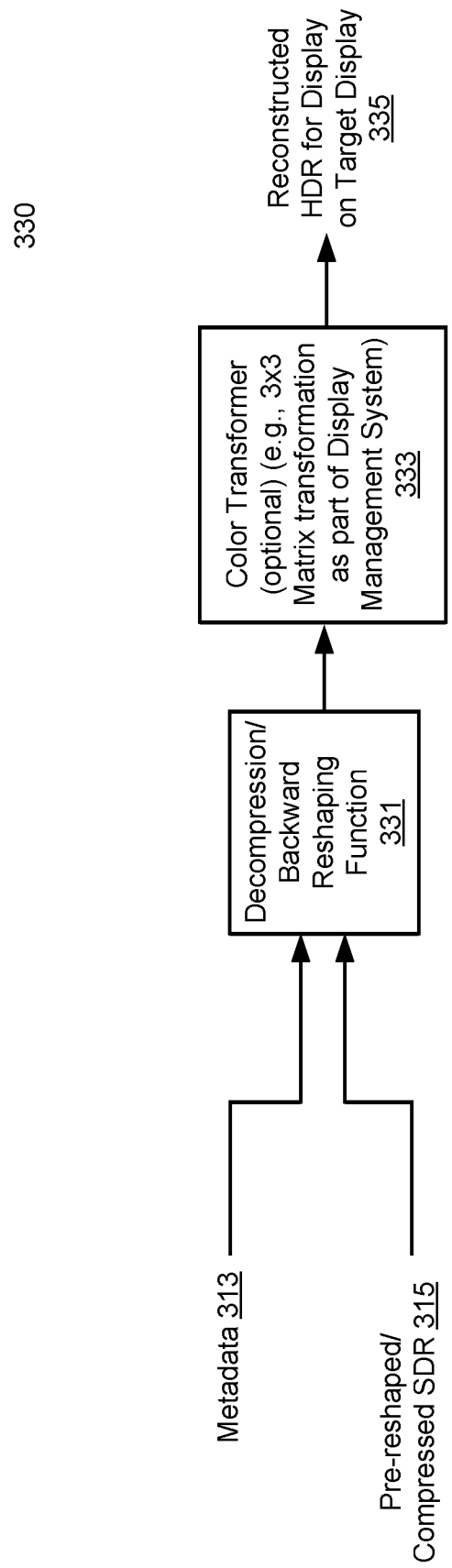
FIG. 3B shows a block diagram of a decoder according to one embodiment.

FIG. 3B shows a block diagram of a decoder according to one embodiment. Decoder 330 includes decompression/backward reshaping function 331 and optionally display management color transformer 333 which can include a display management system such as Dolby Vision in one embodiment. Decompression/backward reshaping function 331 decompresses a base layer signal, such as pre-reshaped/compressed SDR 315. Backward reshaping function 331 receives metadata 313 and applies single-channel predictions (represented by metadata 313) onto the decompressed version of signal 315 to reconstruct a HDR signal. Optionally, display management color transformer 333 applies a 3×3 matrix color transformation to the reconstructed HDR signal to make color corrections. Transformer 333 generates reconstructed HDR 335 to be displayed on a target display device or through a decoder device.

Figure 4A:
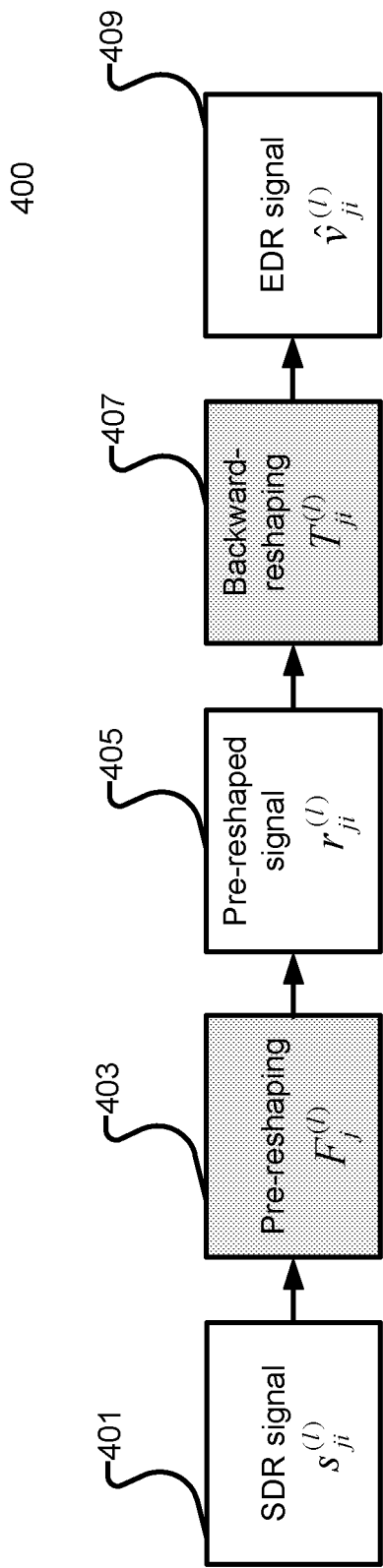
FIGS. 4A and 4B show an exemplary process of a transformation from a SDR to a predicted EDR according to one embodiment.
Figure 4B:
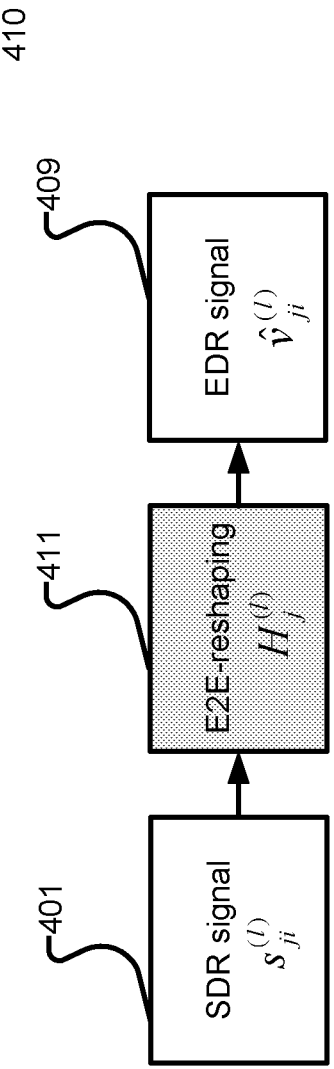

FIGS. 4A and 4B show an exemplary process of a transformation from SDR to a predicted EDR according to one embodiment. Referring to FIG. 4A, in process 400, input SDR signal 401 (e.g., $s_{ji}^{(l)}$) is first converted by a pre-reshaping module 403 (e.g., $F_j^{(l)}$) such that the pre-reshaped signal 405 (e.g., $r_{ji}^{(l)}$) is codec friendly. The pre-reshaped signal 405 is converted via the backward-reshaping module 407 (e.g., $T_j^{(l)}$) to EDR signal 409 (e.g., $\hat{v}_{ji}^{(l)}$). Referring to FIG. 4B, in process 410, input SDR signal 401 is converted by an end-to-end reshaping module 411 (e.g., $H_j^{(l)}$) to EDR signal 409. The pre-reshaping module or function 403 and backward-reshaping module or function 407 can be derived as follows.

Pre-Reshaping Function

Denote the pre-reshaping function as $F_j^{(l)}$ for the lth color channel. Let $r_{ji}^{(l)}$ be the ith pixel value at jth frame in the lth color plane after this pre-reshaping process, i.e.

$$r_{ji}^{(l)} = F_j^{(l)}(s_{ji}^{(l)}).$$

The EDR signal can be mapped using the backward reshaping function $T_j^{(l)}$ as follows:

$$\hat{v}_{ji}^{(l)} = T_j^{(l)}(r_{ji}^{(l)}) = T_j^{(l)}(F_j^{(l)}(s_{ji}^{(l)})) = H_j^{(l)}(s_{ji}^{(l)}).$$

Once $H_j^{(l)}$ and $F_j^{(l)}$ are known, $T_j^{(l)}$ can be derived. Function $H_j^{(l)}$ can be derived from CDF matching as described above from original SDR to targeted EDR.

Luma/Chroma Pre-Reshaping

Various implementations of $F_j^{(l)}$ are discussed as follows for luma and chroma channels to create a better signal for compression efficiency. Two implementations for the luma (l=0) pre-reshaping function are disclosed: linear stretch and power function. In one embodiment, the input range to the entire SDR container range can be scaled with a linear stretch function. The equation for linear stretch can be as follows:

$$r_{ji}^{(0)} = F_j^{(0)}(s_{ji}^{(0)}) = \frac{s_{ji}^{(0)} - s_j^{(0),L}}{s_j^{(0),H} - s_j^{(0),L}} \cdot (N_s - 1).$$

Denote the maximal value of $r_{ji}^{(0)}$ as $r_j^{(0),H}$ and minimal value as $r_j^{(0),L}$ for the jth frame. In another embodiment, the input range to the entire SDR container range can be scaled with a non-linear function, such as a power function as follows:

$$r_{ji}^{(0)} = F_j^{(0)}(s_{ji}^{(0)}) = \left(\frac{s_{ji}^{(0)} - s_j^{(0),L}}{s_j^{(0),H} - s_j^{(0),L}}\right)^\alpha \cdot (N_s - 1)$$

Denote the maximal value of $r_{ji}^{(0)}$ as $r_j^{(0),H}$ and minimal value as $r_j^{(0),L}$ for the jth frame, and $\alpha$ is a power factor value.

In one embodiment, the chroma channels (l=1, 2) can be rescaled according to a ratio between chroma dynamic range to luma dynamic range in SDR. E.g., an additional scale factor $w^{(l)}$ can be applied to balance the bit rate allocation for chroma and luma channels to improve coding efficiency. The dynamic range for each channel can be expressed as:

$$R_j^{(l)} = clip3\left(w^{(l)}(r_{ji}^{(0),H} - r_{ji}^{(0),L})\left(\frac{s_j^{(l),H} - s_j^{(l),L}}{s_j^{(0),H} - s_j^{(0),L}}\right), 0, N_s - 1\right),$$

for l=1 and 2.

Let the center of the quantized value be mid_range. After quantization, the minimal ($R_j^{(l),L}$) and maximal value ($R_j^{(l),H}$) in the $l^{th}$ color channel are:

$$R_j^{(l),L} = \text{mid\_range} - \frac{R_j^{(l)}}{2};$$

and $R_j^{(l),H}$=mid_range+$R_j^{(l)}$/2, for l=1 and 2.

The quantization slope ratio before and after quantization is defined to be:

$$q_j^{(l)} = \frac{R_j^{(l),H} - R_j^{(l),L}}{s_j^{(l),H} - s_j^{(l),L}},$$

for l=1 and 2.

The quantization can be applied by first subtracting the lowest value in SDR domain, then multiplying the slope, and adding the lowest value after the quantization domain:

$$r_{ji}^{(l)} = clip3(\lfloor q_j^{(l)}(s_{ji}^{(l)} - s_j^{(l),L}) + R_j^{(l),L} + 0.5 \rfloor, 0, N_s - 1), \text{ for}$$
l=1 and 2

Given that each of the color channels of the pre-reshaping function can be expressed as linear functions, each of the color channels can be rewritten as:

$$r_{ji}^{(l)} = F_j^{(l)}(s_{ji}^{(l)}) = \alpha_j^{(l)} \cdot s_{ji}^{(l)} + \beta_j^{(l)}.$$

The 3 channel $\{r_{ji}^{(l)}\}$ can then be used by a compression scheme, such as, H.264/AVC or H.265/HEVC based compressions.

Figure 5A:
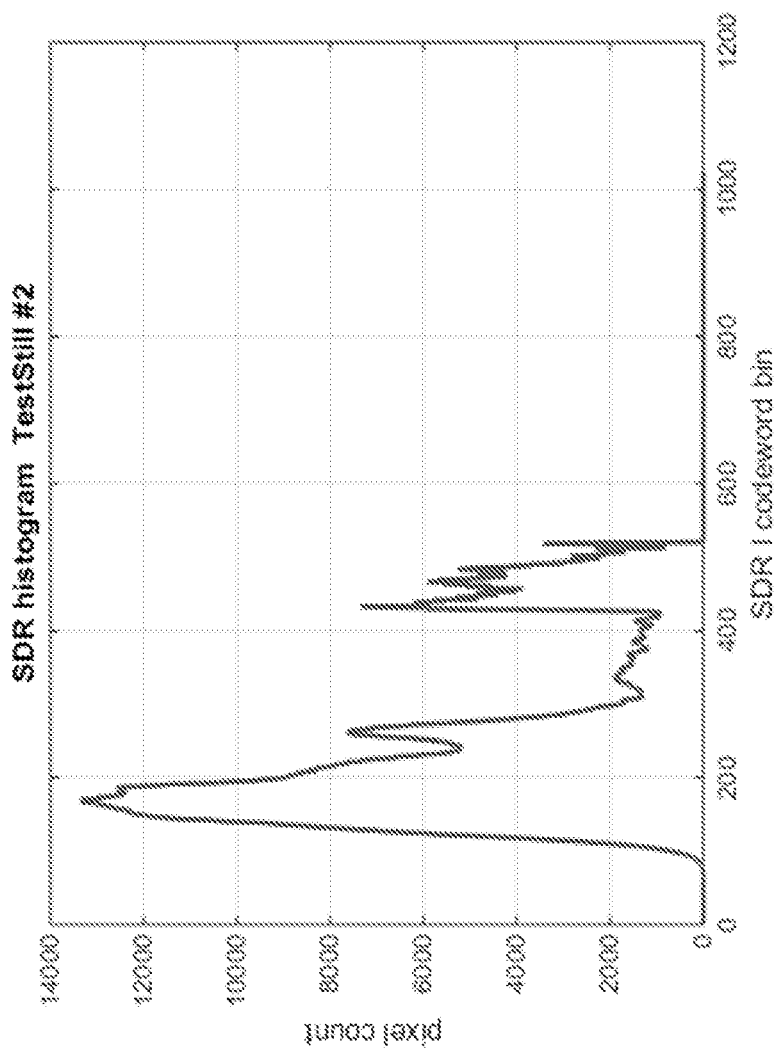
FIG. 5A is an example diagram of a probability density function of SDR according to one embodiment.
Figure 5B:
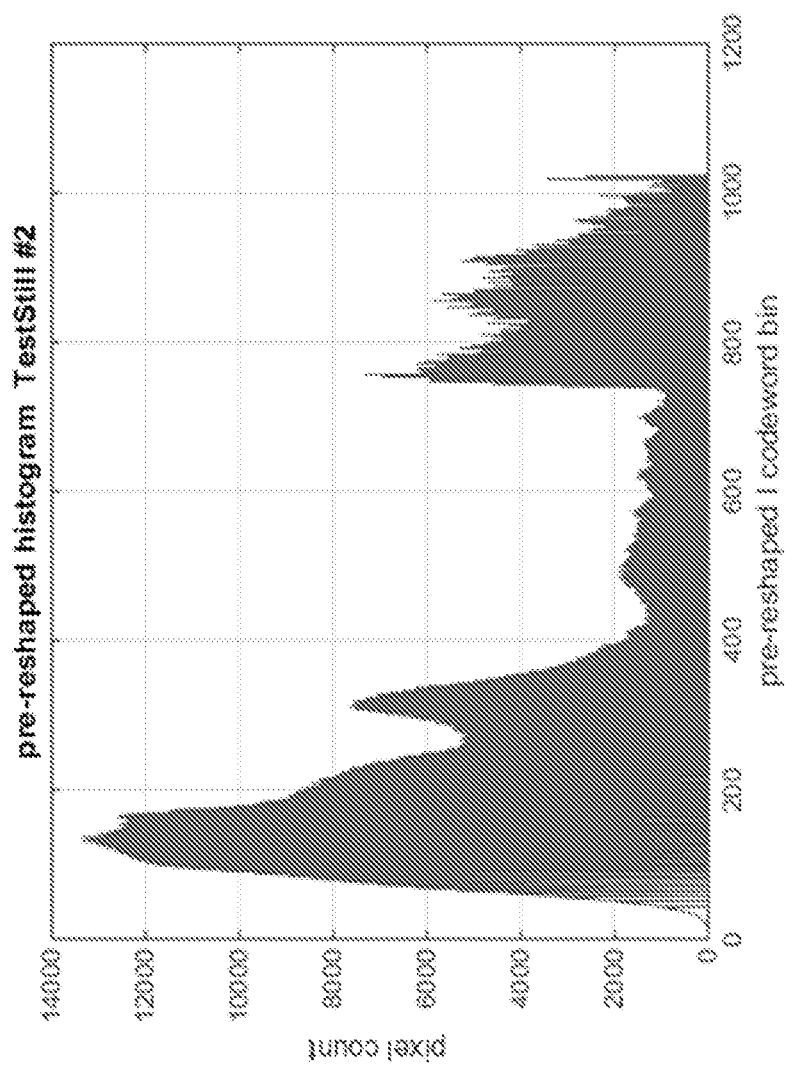
FIG. 5B is an example diagram of a probability density function of a pre-shaped SDR according to one embodiment.

FIG. 5A is an example histogram of a SDR signal according to one embodiment. FIG. 5B is an example figure showing a pre-reshaped histogram $\{h_{jb}^{(l),r}\}$ corresponding to FIG. 5A using a power function with $\alpha$=1.5 according to one embodiment. Comparing FIGS. 5A and 5B, the original SDR signal occupies about half of the codeword bin, while the pre-reshaped signal have codeword bin distributed to occupy more bins so the pre-reshaped signal is codec friendly.

Backward Reshaping Function

There are several ways a backward reshaping function (e.g., $T_j^{(l)}$) can be constructed. In one embodiment, backward reshaping function $T_j^{(l)}$ can be built upon the histogram of the pre-reshaped signal $r_{ji}^{(l)}$ and the EDR signal $v_{ji}^{(l)}$ using a CDF matching method such that $\hat{v}_{ji}^{(l)} = T_j^{(l)}(r_{ji}^{(l)})$. Note that the pre-reshaped signal $r_{ji}^{(l)}$ needs to be ready in order to apply this methodology.

In one embodiment, the histogram of the pre-reshaped signal $r_{ji}^{(l)}$ is constructed by applying a histogram transfer algorithm based on the histogram of the SDR signal, i.e. the SDR signal to which no pre-reshaping is applied. Let the histogram for SDR and iDM (or EDR) be $\{h_{jb}^{(l),s}\}$ and $\{h_{jb}^{(l),v}\}$, respectively, for the lth channel. Given a pre-reshaping function $F_j^{(l)}$ a histogram transfer can be applied to transfer a histogram of SDR $\{h_{jb}^{(l),s}\}$ to a histogram of a pre-reshaped signal $\{h_{jb}^{(l),r}\}$. Table 2 below illustrates the algorithm to apply a histogram transfer function to construct a histogram for pre-reshaped signal $r_{ji}^{(l)}$. The algorithm can be applied to each of the three color channels.

TABLE 2

```
// initialization
h_{jb}^{(l),r} = 0; for all b.
// for each codeword, find the mapped value in pre-reshaped domain,
add the histogram
for (b = 0 , b < Ns; b++ ){
    λ_b = F_j^{(l)}(b)
    Find nearest integer of λ_b as λ̃_b
    h_{jλ̃_b}^{(l),r} = h_{jλ̃_b}^{(l),r} + h_{jb}^{(l),s}
}
```

Given $\{h_{jb}^{(l),r}\}$ and $\{h_{jb}^{(l),v}\}$, we can build the CDF $\{c_{jb}^{(l),r}\}$ and $\{c_{jb}^{(l),v}\}$ for the lth channel based on their respective histograms. CDF matching can then be applied based on the constructed CDFs to determine the backward reshaping function $T_j^{(l)}$.

Figure 5C:
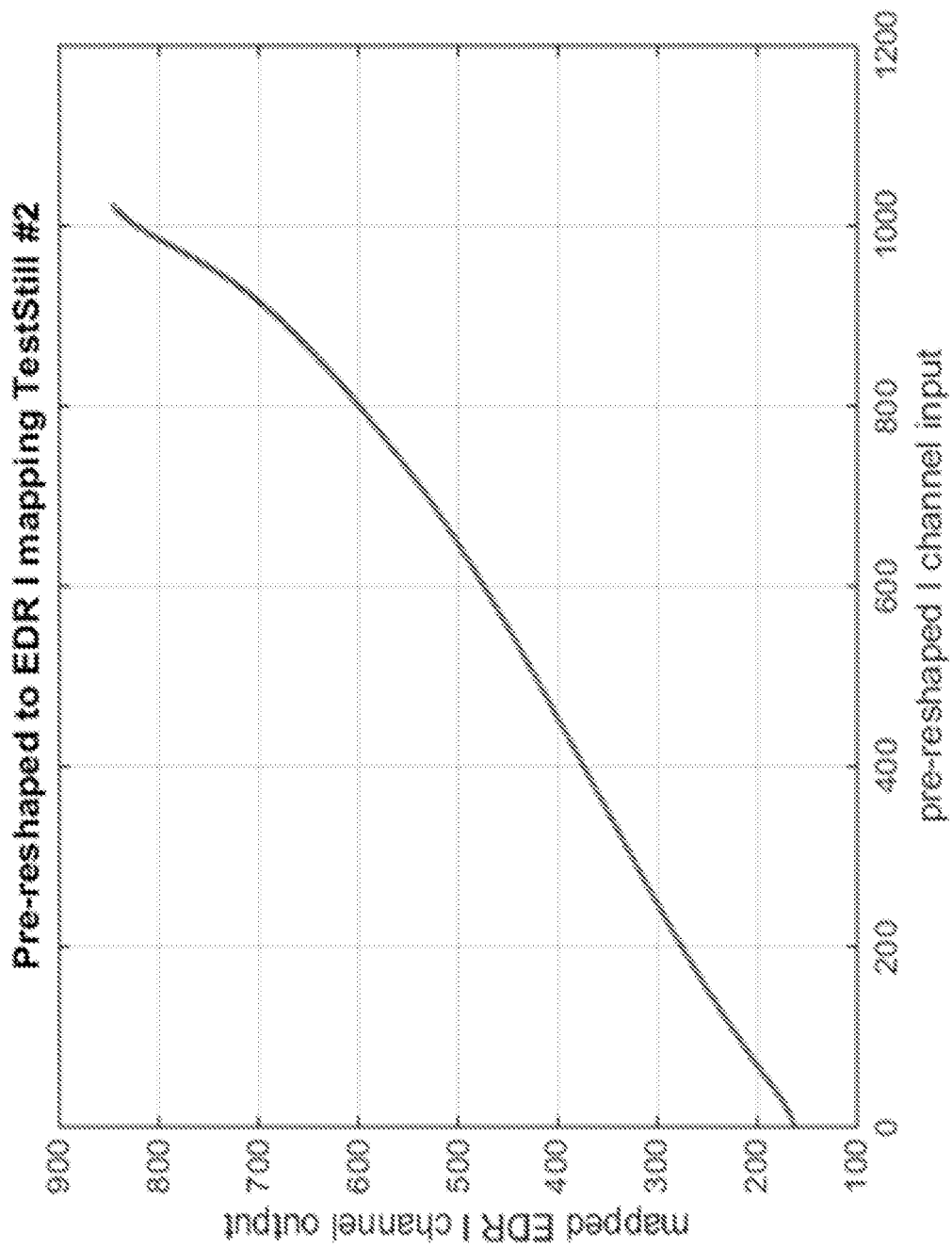
FIG. 5C shows a mapping function for a luma channel (pre-shaped SDR to predicted EDR) according to one or more embodiments described herein.

FIG. 5C illustrate an example backward reshaping function $T_j^{(l)}$ (the luma channel) constructed by applying CDF matching to the SDR signal of FIG. 5A and the pre-reshaped signal of FIG. 5B according to one embodiment. The backward reshaping function, together with a pre-reshaped signal can be used to reconstruct the EDR signal.

In another embodiment, $T_j^{(l)}$ can be constructed directly by direct function decomposition (DFD). Referring to FIGS. 4A and 4B, $H_j^{(l)} = T_j^{(l)}(F_j^{(l)})$ can be the end-to-end transformation function. Function $H_j^{(l)}$ can be derived from CDF matching as described above from original SDR to targeted EDR. $F_j^{(l)}$ is the pre-reshaping function to pre-reshape the SDR signal. $T_j^{(l)}$ can be constructed once $H_j^{(l)}$ and $F_j^{(l)}$ are known. Table 3 illustrates the algorithm to apply a DFD to determine the backward reshaping function $T_j^{(l)}$. The algorithm can be applied to each of the three color channels. Note application of the DFD algorithm does not require a pre-reshaped signal $r_{ji}^{(l)}$, thus, the DFD algorithm can be applied in parallel to or prior to determination of the pre-reshaped signal.

TABLE 3

```
// find mapped value in reshaped domain and EDR domain for each code-
word for ( b = 0, b < Ns; b++ ){
    λ_b = F_j^{(l)}(b)
    κ_b = H_j^{(l)}(b)
}
// find interpolated mapped codeword
for ( b = 0, b < Ns; b++ ){
    find k which satisfies λ_k ≤ b < λ_{k+1}
```

$$T_j^{(l)}(b) = \frac{b - \lambda_k}{\lambda_{k+1} - \lambda_k}(\kappa_{b+1} - \kappa_b) + \kappa_b$$

```
}
```

FIGS. 6A and 6B show a second exemplary process of a transformation from SDR to predicted EDR according to one embodiment. Referring to FIGS. 6A and 6B, processes 600 and 610, respectively, are similar to processes 400 and 410 of FIGS. 4A and 4B, respectively. The exception is that processes 600 and 610 include a 3×3 color transformation matrix 601. The 3×3 color transformation matrix 601 can be color transformer 333 of FIG. 3B. In one embodiment, 3×3 transformation matrix 601 is part of display management system. In one embodiment, a 3×3 transformation matrix 601 can be applied to a pre-reshaped EDR signal to adjust colors.

Referring to FIG. 6A, the pre-reshaping function 403 ($F_j^{(l)}$) can be constructed to pre-reshape a SDR signal to be codec friendly as described above. The pre-reshaped EDR signal 409 ($h_{ji}^{(l)}$) is then, $$h_{ji}^{(l)} = T_j^{(l)}(r_{ji}^{(l)}) = T_j^{(l)}(F_j^{(l)}(s_{ji}^{(l)}))$$

where $T_j^{(l)}$ is backward reshaping function 407, $r_{ji}^{(l)}$ is pre-reshaped signal 405, and $s_{ji}^{(l)}$ is SDR signal 401. The 3×3 color transformation matrix 601 (e.g., $G_j$) can be applied to EDR signal 409 $h_{ji}^{(l)}$, where l=0, 1, and 2 (e.g., the three color channels), to generate a final estimated EDR signal 603 ($\hat{v}_{ji}^{(l)}$) that provides a better color estimation to estimate EDR signal 603. E.g., $\hat{v}_{ji}^{(l)} = G_j(h_{ji}^{(0)}, h_{ji}^{(1)}, h_{ji}^{(2)})$.

In this case, $F_j^{(l)}$, $T_j^{(l)}$, and $G_j$ can be constructed to minimize a cost between a reference EDR signal ($v_{ji}^{(0)}$, $v_{ji}^{(1)}$, $v_{ji}^{(2)}$) (such as Ref HDR 101 of FIG. 3A) and estimated EDR signal 603 ($\hat{v}_{ji}^{(0)}$, $\hat{v}_{ji}^{(1)}$, $\hat{v}_{ji}^{(2)}$) for the three color channels.

For example, the cost may be a distance between ($v_{ji}^{(0)}$, $v_{ji}^{(1)}$, $v_{ji}^{(2)}$) and ($\hat{v}_{ji}^{(0)}$, $\hat{v}_{ji}^{(1)}$, $\hat{v}_{ji}^{(2)}$) for all pairs of reference EDR signal and estimated EDR signals. The cost function is then:

$$D_j = \text{cost}(\hat{v}_{ji}^{(l)}, v_{ji}^{(l)}) = \sum_{i=0}^{P-1}\left(\sum_{l=0}^{2}\|\hat{v}_{ji}^{(l)} - v_{ji}^{(l)}\|^2\right)^{1/2}$$

The cost function can be solved or minimized iteratively. For example, let superscript k be the iteration number. Then the overall cost function, or the 3×3 color transformation matrix to be minimized would be:

$$G_j^{(k),opt} = \underset{G_j^{(k)}}{\arg\min}\|V_j - \hat{V}_j^{(k)}\|^2, \text{ and}$$

$$G_j^{(k)} = \begin{bmatrix} g_{j,00}^{(k)} & g_{j,01}^{(k)} & g_{j,02}^{(k)} \\ g_{j,10}^{(k)} & g_{j,11}^{(k)} & g_{j,12}^{(k)} \\ g_{j,20}^{(k)} & g_{j,21}^{(k)} & g_{j,22}^{(k)} \end{bmatrix}.$$

Let $v_{j,i}$ and $h_{j,i}^{(k)}$ be vectors of reference EDR signal (such as signal 101 of FIG. 3A) and pre-reshaped EDR signal (such as signal 409 of FIG. 6A-6B), respectively, such that $v_{j,i}$ and $h_{j,i}^{(k)}$ storing three color channel values would be:

$$v_{j,i} = \begin{bmatrix} v_{j,i}^{(0)} \\ v_{j,i}^{(1)} \\ v_{j,i}^{(2)} \end{bmatrix} \text{ and } h_{j,i}^{(k)} = \begin{bmatrix} h_{j,i}^{(0),(k)} \\ h_{j,i}^{(1),(k)} \\ h_{j,i}^{(2),(k)} \end{bmatrix}.$$

Let $V_j$ and $H_j^{(k)}$ be matrices of reference EDR signal and pre-reshaped EDR signal, respectively, such that all pixels from the three channels combined together into a single matrix would be:

$$V_j = \begin{bmatrix} (v_{j,0})^T \\ (v_{j,1})^T \\ \vdots \\ (v_{j,P-1})^T \end{bmatrix} \text{ and } H_j^{(k)} = \begin{bmatrix} (h_{j,0}^{(k)})^T \\ (h_{j,1}^{(k)})^T \\ \vdots \\ (h_{j,P-1}^{(k)})^T \end{bmatrix}.$$

The least square solution of $G_j^{(k),opt}$ would be:

$$G_j^{(k),opt} = ((H_j^{(k)})^T H_j^{(k)})^{-1}((H_j^{(k)})^T V_j).$$

The predicted pre-reshaped EDR signal, e.g., $\tilde{H}_j^{(k)}$, can then be obtained from the inverse matrix of $G_j^{(k),opt}$ (i.e. $G_j^{(k),opt})^{-1}$) and the reference EDR $V_j$ by the equation:

$$\tilde{H}_j^{(k)} = V_j (G_j^{(k),opt})^{-1}.$$

Table 4 illustrates an exemplary algorithm to iteratively minimize a cost function. Note CDFM refers to cumulative distribution function (CDF) matching.

TABLE 4

```
// STEP 1: initialization k = 0
//Use original s_ji^(l) and originalv_ji^(l) to build the single-channel
mapping function
    H_j^(l),(0) = CDFM(s_ji^(l), v_ji^(l))
// compute predicted value h_ji^(l),(0)
    h_ji^(l),(0) = H_j^(l),(0)(s_ji^(l))
// compute 3 × 3 matrix
    G_j^(0),opt = ((H_j^(k))^T H_j^(k))^-1((H_j^(k))^T V_j)
// compute predicted EDR
    V̂_j^(0) = H_j^(0) G_j^(0),opt
// compute distortion
    D_j^(0) = cost(V_j, V̂_j^(0))
// STEP 2: iteration, for k > 0
    k++;
// compute h̃_ji^(l),(k) via back conversion
    H̃_j^(k) = clip3(V_j(G_j^(k),opt)^-1, 0,1)
// Use original s_ji^(l) and h̃_ji^(l),(k) to build the single-channel
mapping function
    H_j^(l),(k) = CDFM(s_ji^(l), h̃_ji^(l),(k))
// compute predicted value h_ji^(l),(k)
    h_ji^(l),(k) = H_j^(l),(k)(s_ji^(l))
// compute 3 × 3 matrix
    G_j^(k),opt = ((H_j^(k))^T H_j^(k))^-1((H_j^(k))^T V_j)
// compute predicted EDR
    V̂_j^(k) = H_j^(k) G_j^(k),opt
// compute distortion
    D_j^(k) = cost(V_j, V̂_j^(k))
// STEP 3: check convergence
If(D_j^(k) < D_j^(k-1))
    Go back to STEP 2 for refining
else
    Use k − 1 result
end
// STEP 4: decompose H_j^(l),(k)
// compute required pre-reshaping signal for coding efficiency
    F_j^(l)
// use the method in previous section to get
    T_j^(l) = decompose(H_j^(l), F_j^(l))
```

Figure 7A:
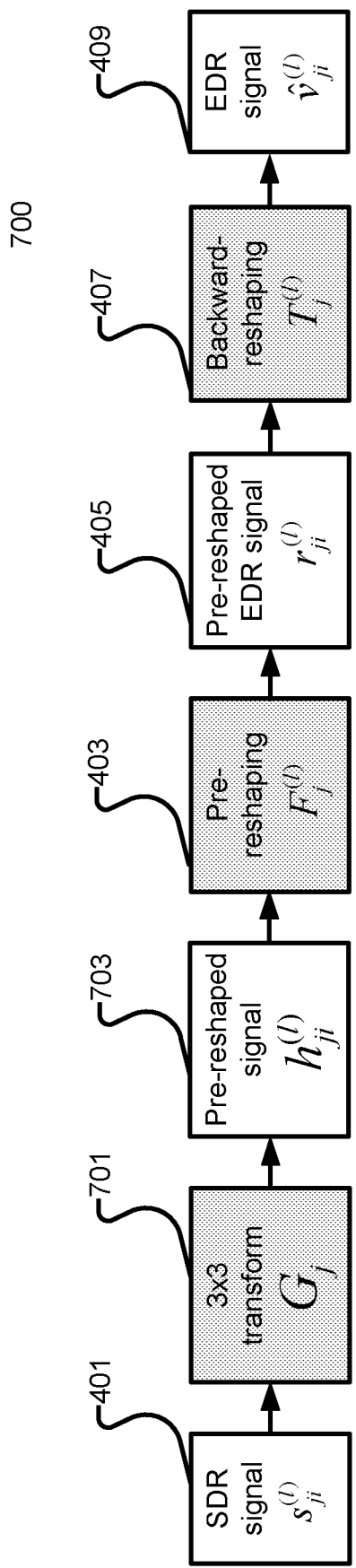
FIGS. 7A and 7B show an exemplary process of a transformation from SDR to predicted EDR according to one embodiment.
Figure 7B:
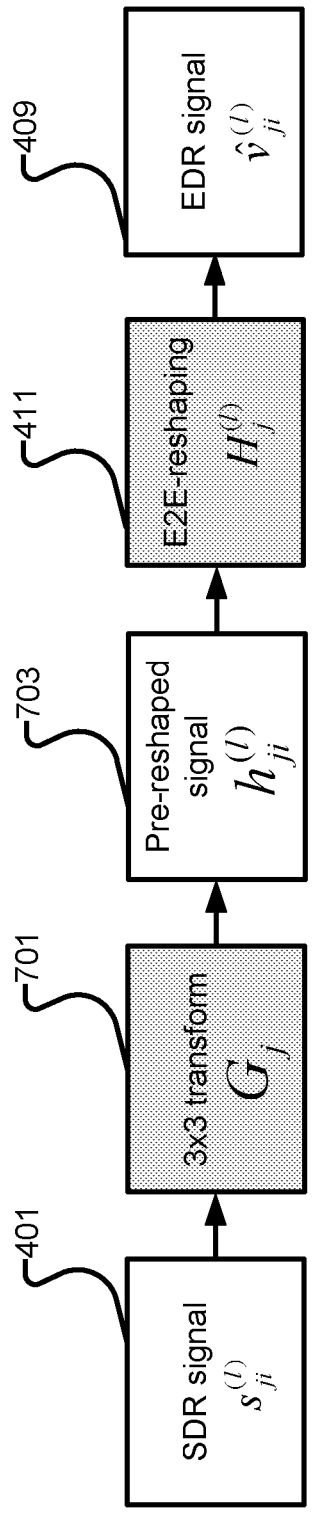

FIGS. 7A and 7B show an exemplary process of a transformation from SDR to predicted EDR according to one embodiment. Referring to FIGS. 7A and 7B, processes 700 and 710 are similar to processes 600 and 610 of FIGS. 6A and 6B, respectively, except that a 3×3 transformation matrix, such as 3×3 transformation matrix 701, is applied to SDR 401 to correct for colors before SDR 401 is pre-reshaped. In another embodiment, a 2×2 transformation matrix is applied to a SDR signal in the ICtCp color space to correct for colors for two chroma channels before the SDR signal is pre-reshaped.

Figure 8:
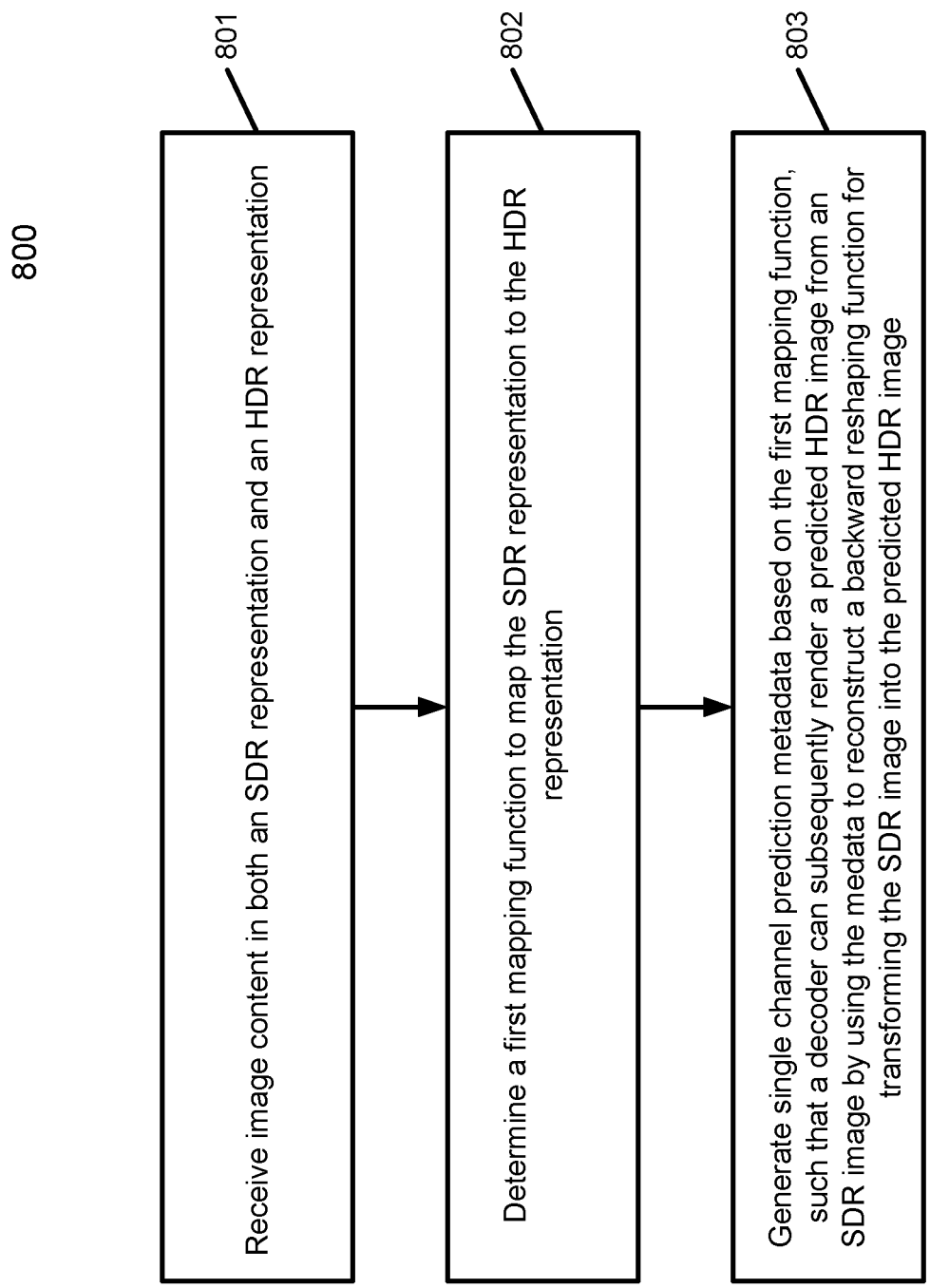
FIG. 8 is a flowchart that shows a method according to one or more embodiments.

FIG. 8 is a flowchart that shows a method according to one or more embodiments of the invention, and this method can be performed by an encoder device such as encoder 120 of FIG. 1 or encoder 300 of FIG. 3A. Method or process 800 may be performed by processing logic which may include software, hardware, or a combination thereof. For example, process 800 may be performed by generators 105 and 107 of FIG. 1. Referring to FIG. 8, at block 801, processing logic receives image content in both an SDR representation and an HDR representation. At block 802, processing logic determines a first mapping function to map codewords of at least one color channel of the standard dynamic range representation to codewords of at least one color channel of the high dynamic range representation. At block 803, processing logic generates single channel prediction metadata based on the first mapping function, such that a decoder can subsequently render or display a predicted high dynamic range image from a standard dynamic range image by using the metadata to reconstruct a backward reshaping function for transforming at least one color channel of the standard dynamic range image content to a corresponding at least one color channel of the predicted high dynamic range image.

The process 800 further comprises accessing a pre-reshaping function for scaling the at least on color channel of the SDR representation. For example, the pre-reshaping function may be a predetermined function, e.g. stored on a non-transitory computer readable medium. In another example, the pre-reshaping function is determined based on the SDR representation, e.g. by scaling of the SDR representation. In a first example, scaling comprises linear scaling, e.g. using a linear stretch function. In a second example, scaling comprises non-linear scaling, e.g. power law scaling.

In a first embodiment, determining the first mapping function includes generating a first and a second cumulative distribution functions (CDFs) representing the cumulative distribution of the codewords of at least one color channel of the standard dynamic range representation and the cumulative distribution of the codewords of the corresponding at least one channel of the high dynamic range representation, respectively, wherein the first and second CDFs associate each codeword to a corresponding CDF value. The determining the first mapping further includes applying a cumulative distribution function matching based on the first and the second CDFs, comprising matching each codeword of the first CDF to a codeword of the second CDF that has a CDF value that matches the CDF value of said codeword of the first CDF, wherein the codewords of the first CDF define the input codewords of the first mapping function and the matched codewords of the second CDF define the output codewords of the first mapping function. In the first embodiment, the backward reshaping function is determined by function decomposition of H=T(F(b)), wherein H represents the first mapping function described above, T represents the backward reshaping function that is to be determined by the function decomposition, F represents the pre-reshaping function and b represents input of the pre-reshaping function. The single channel prediction metadata is generated representative of the backward reshaping function.

In the first embodiment, the first mapping function maps input codewords to output codewords. The input codewords correspond to the codewords of the first CDF. The output codewords correspond to the codewords of the second CDF. Therefore, the first mapping function maps codewords of the at least one color channel of the SDR representation to codewords of the corresponding at least one color channel of the HDR representation.

In a second embodiment, determining the first mapping function includes generating a first and a second cumulative distribution functions (CDFs) representing the cumulative distribution of the codewords of the at least one color pre-reshaped color channel and the cumulative distribution of the codewords of the corresponding at least one channel of the high dynamic range representation, respectively, wherein the first and second CDFs associate each codeword to a corresponding CDF value. The determining the first mapping further includes applying a cumulative distribution function matching based on the first and the second CDFs, comprising matching each codeword of the first CDF to a codeword of the second CDF that has a CDF value that matches the CDF value of said codeword of the first CDF, wherein the codewords of the first CDF define the input codewords of the first mapping function and the matched codewords of the second CDF define the output codewords of the first mapping function. The backward reshaping function is determined based on the first mapping function. The single channel prediction metadata is generated representative of the backward reshaping function.

In the second embodiment, the first mapping function maps input codewords to output codewords. The input codewords correspond to the codewords of the first CDF. The output codewords correspond to the codewords of the second CDF. Therefore, the first mapping function maps codewords of the at least one pre-reshaped color channel to codewords of the corresponding at least one color channel of the HDR representation.

In an example, the backward reshaping function is determined to be identical to the first mapping function. In another example, the backward reshaping function is derived from the first mapping function, e.g. by applying a smoothing and/or clipping operation to the first mapping function.

In another embodiment, processing logic further converts the standard dynamic range representation and the high dynamic range representation into a predetermined color space, wherein optionally the predetermined color space is the IPT color space or the $IC_TC_P$ color space.

Optionally, the high dynamic range representation is derived from the standard dynamic range representation.

In one embodiment, the single channel prediction metadata includes a one-dimensional lookup table for each color channel of a multi-channel color space mapping standard dynamic range image content to predicted high dynamic range image content for the respective color channel. In another embodiment, the one-dimensional lookup table is represented by a second order polynomial such that three coefficients of the second order polynomial are used to approximate the mapping of the one-dimensional lookup table.

In another embodiment, the pre-reshaping function for a luma channel of the SDR representation comprises a first transformation and the pre-reshaping function for a chroma channel of the SDR representation includes a second transformation, wherein the second transformation is a different transformation than the first transformation.

In another embodiment, processing logic further applies a color space transformation to adjust colors of image frames. In embodiment first example, the color space transformation is applied to the at least one color channel of the standard dynamic range representation before the at least one color channel of the standard dynamic range representation is pre-reshaped. In second example, the color space transformation is applied to at least one backward-reshaped pre-reshaped color channel to estimate the corresponding color channel of the HDR representation. In a further embodiment, processing logic determines the parameters of the color space transformation by minimizing a cost function of a distance between pixels of the high dynamic range representation and the estimated high dynamic range representation for each of the color channels.

Figure 9:
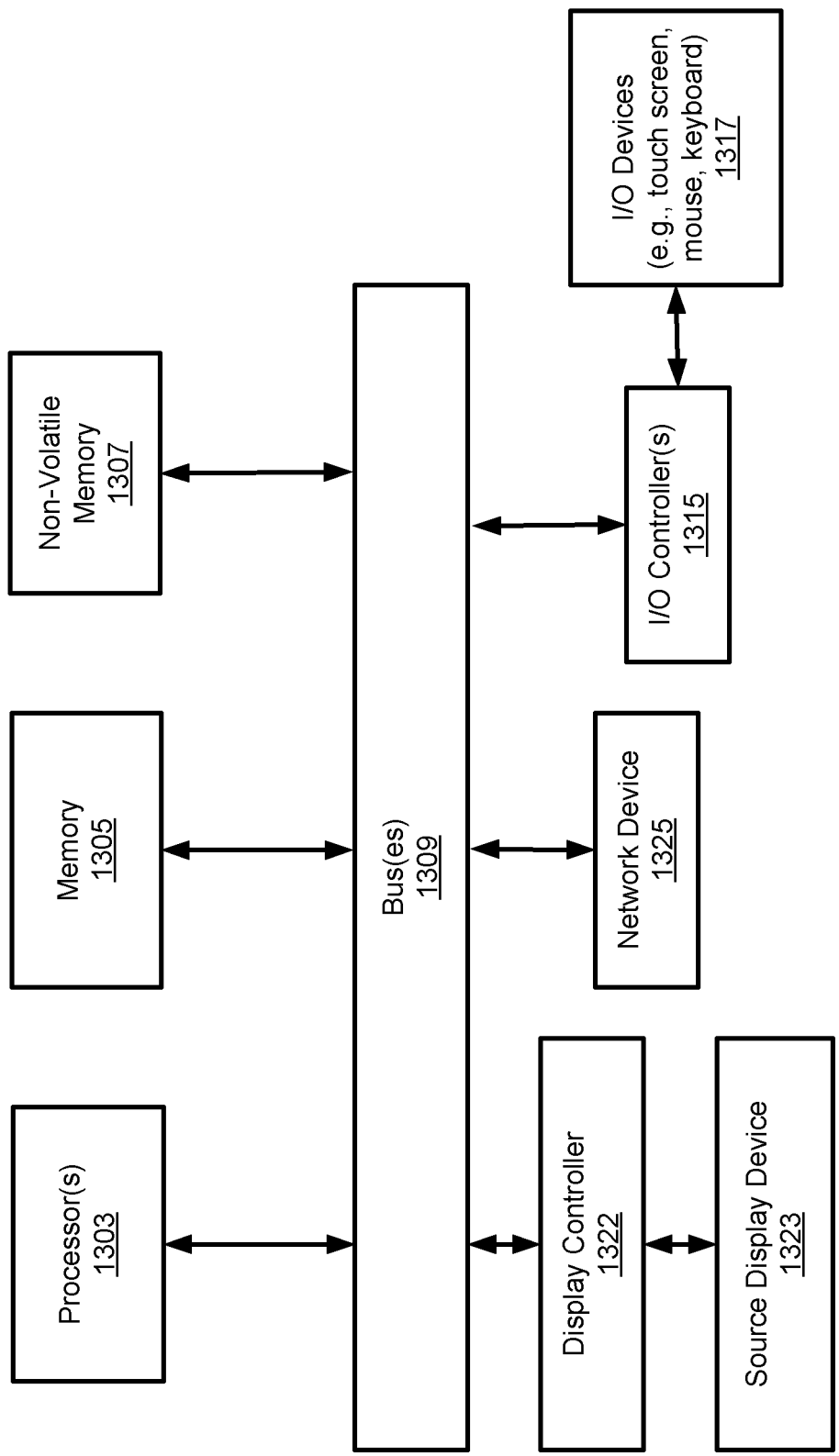
FIG. 9 shows an example of a data processing system.

FIG. 9 shows an example of a data processing system that can be used to implement a decoder such as the decoder 130 in FIG. 1 or the decoder 330 in FIG. 3B. The systems and methods described herein can be implemented in a variety of different data processing systems and devices, including general-purpose computer systems, special purpose computer systems, or a hybrid of general purpose and special purpose computer systems. Data processing systems that can use any one of the methods described herein include desktop computers, laptop computers, tablet computers, embedded electronic devices, or other electronic devices.

FIG. 9 is a block diagram of data processing system hardware according to an embodiment. Note that while FIG. 9 illustrates the various components of a data processing system, it is not intended to represent any particular architecture or manner of interconnecting the components as such details are not germane to the present invention. It will also be appreciated that other types of data processing systems that have fewer components than shown or more components than shown in FIG. 9 can also be used with one or more embodiments of the present invention.

As shown in FIG. 9, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a source display device 1323. The source display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The colorist can use the one or more input devices to adjust color trims for one or more images. The input/output devices 1317 are coupled through one or more I/O controllers 1315 as is known in the art.

While FIG. 9 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WiFi, Bluetooth) that receive images from a camera, etc.

It will be apparent from this description that one or more embodiments of the present invention may be embodied, at least in part, in software. That is, the techniques may be carried out in a data processing system in response to its one or more processor(s) executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Various aspects of the present invention may be appreciated from the following enumerated example embodiments (EEEs):

1. A method for generating a single channel predictor for rendering high dynamic range image content using standard dynamic range image content, the method comprising:
    receiving a standard dynamic range image content and a representation of a high dynamic range image content;
    determining a first mapping function to map the standard dynamic range image content to the representation of the high dynamic range image content; and
    generating a single channel prediction metadata based on the first mapping function, such that a decoder can subsequently render a predicted high dynamic range image content by applying the metadata to transform the standard dynamic range image content to the predicted high dynamic range image content.
2. The method of EEE 1, wherein determining a first mapping function comprises:
    generating a first and a second cumulative distribution functions (CDFs) based on the standard dynamic range image content and the representation of the high dynamic range image content respectively; and
    applying a cumulative distribution function matching based on the first and the second CDFs.
3. The method of EEE 1 or 2, further comprising converting the standard dynamic range image content and the representation of the high dynamic range image content into a predetermined color space and wherein the representation of the high dynamic range image content is generated based on the standard dynamic range image content.
4. The method of any preceding EEE, wherein the metadata comprises an one-dimensional lookup table for each color channel of a multi-channel color space mapping standard dynamic range image content to the predicted high dynamic range image content for the respective color channel.
5. The method of EEE 4, wherein the one-dimensional lookup table is represented by 8-piece second order polynomial such that three coefficients of the second order polynomial in each piece are used to approximate the mapping of the one-dimensional lookup table.
6. The method of any preceding EEE, wherein generating a metadata comprises generating a unique metadata for each image frame of a video recording of the standard dynamic range image content.
7. The method of any preceding EEE, wherein generating a metadata comprises generating a unique metadata for each scene of a video recording of the standard dynamic range image content.
8. The method of any preceding EEE, further comprising:
    applying a second mapping function to the standard dynamic range image content, wherein the second mapping function represents a pre-reshaping transformation such that the standard dynamic range image content is pre-reshaped before it is transmitted to a decoder; and
    determining a third mapping function representing a backward-reshaping function mapping the pre-reshaped standard dynamic range image content to the representation of the high dynamic range image content, wherein the single channel prediction metadata is generated based on the third mapping function, such that a decoder can subsequently render a predicted high dynamic range image content by applying the metadata to the pre-reshaped standard dynamic range image content to the predicted high dynamic range image content.
9. The method of EEE 8, wherein applying a second mapping function comprises applying a first transformation to a luma channel of the standard dynamic range image content.
10. The method of EEE 9, wherein applying a second mapping function comprises applying a second transformation to a chroma channel of the standard dynamic range image content, wherein the second transformation is a different transformation than the first transformation.
11. The method of EEE 8 or 9, wherein determining a third mapping function comprises matching cumulative distribution functions based on a CDF of the representation of the high dynamic range image content and a CDF of the pre-reshaped standard dynamic range image content.
12. The method of EEE 11, wherein a CDF of the pre-reshaped standard dynamic range image content is generated from a probability distribution function (PDF) of the pre-reshaped standard dynamic range image content, wherein a PDF of the pre-reshaped standard dynamic range image content is generated for each channel codeword of each color channel by shifting PDF values of the standard dynamic range image content at the channel codeword to a channel codeword corresponding to a product of the channel codeword and the second mapping function at the channel codeword.
13. The method of any one of EEEs 8 to 12, wherein determining a third mapping function comprises applying function decomposition based on the first and the second mapping function, wherein the first mapping function is decomposed into the second and the third mapping functions.

14. The method of EEE 13, wherein applying function decomposition comprises:
    determining a fourth mapping function based on the channel codeword and the first mapping function, and a fifth mapping function based on the channel codeword and the second mapping function;
    determining coefficients for each channel codeword of each color channel to represent the third transfer function by linear interpolation based on the channel codeword, the fourth mapping function, and the fifth mapping function, such that the third mapping function can be determined without the pre-reshaped standard dynamic range image content.

15. The method of any one of EEEs 8 to 14, further comprising applying a color space transformation to adjust colors of image frames of the standard dynamic range image content.

16. The method of EEE 15, wherein the color space transformation is applied to the standard dynamic range image content before the standard dynamic range image content is pre-reshaped.

17. The method of EEE 15, wherein the color space transformation is applied to a backward-reshaped pre-reshaped standard dynamic range image content to estimate a high dynamic range image content.

18. The method of EEE 17, further comprising minimizing a cost function based on the representation of the high dynamic range image content and the estimated high dynamic range image content.

19. The method of EEE 18, wherein the cost function is minimized by reducing a distance of each pixels corresponding to the representation of the high dynamic range image content and the estimated high dynamic range image content for each of the color channels.

20. A non-transitory machine readable medium storing instructions which when executed by a data processing system cause the system to perform a method as in any one of EEEs 1-19.

21. A data processing system which includes a memory and a processor configured to perform a method as in any one of EEEs 1-19.

The invention claimed is:

1. A method for generating single channel prediction metadata for rendering a predicted high dynamic range, HDR, image from a standard dynamic range, SDR, image, such that a decoder can subsequently render the predicted HDR image by using the single channel prediction metadata to reconstruct a backward reshaping function for transforming at least one color channel of the SDR image to a corresponding at least one color channel of the predicted HDR image, the method comprising:
    receiving image content, said image content being received in both an SDR representation and an HDR representation;
    accessing a pre-reshaping function for scaling the at least one color channel of the SDR representation;
    applying the pre-reshaping function to the at least one color channel of the SDR representation to obtain at least one pre-reshaped color channel for transmission to the decoder;
    determining a first mapping function for mapping input codewords to output codewords, comprising:
        generating a first and a second cumulative distribution functions (CDFs) representing the cumulative distribution of codewords of the at least one color channel of the SDR representation and the cumulative distribution of codewords of the corresponding at least one color channel of the HDR representation respectively, wherein the first and second CDFs associate each codeword with a corresponding CDF value; and
        applying a cumulative distribution function matching based on the first and the second CDFs, comprising matching each codeword of the first CDF to a codeword of the second CDF that has a CDF value that matches the CDF value of said codeword of the first CDF, wherein the codewords of the first CDF define the input codewords of the first mapping function and the matched codewords of the second CDF define the output codewords of the first mapping function;
    determining the backward reshaping function by function decomposition of $H=T(F(b))$ wherein H represents the determined first mapping function, T represents the backward reshaping function to be determined by the decomposition, F represents the pre-reshaping function and b represents input of the pre-reshaping function; and
    generating the single channel prediction metadata representative of the backward reshaping function.

2. A method for generating single channel prediction metadata for rendering a predicted high dynamic range, HDR, image from a standard dynamic range, SDR, image, such that a decoder can subsequently render the predicted HDR image by using the single channel prediction metadata to reconstruct a backward reshaping function for transforming at least one color channel of the SDR image to a corresponding at least one color channel of the predicted HDR image, the method comprising:
    receiving image content, said image content being received in both an SDR representation and an HDR representation;
    accessing a pre-reshaping function for scaling the at least one color channel of the SDR representation;
    applying the pre-reshaping function to the at least one color channel of the SDR representation to obtain at least one pre-reshaped color channel for transmission to the decoder;
    determining a first mapping function for mapping input codewords to output codewords, comprising:
        generating a first and a second cumulative distribution functions (CDFs) based on the cumulative distribution of codewords of the at least one pre-reshaped color channel and the cumulative distribution of codewords of the corresponding at least one color channel of the HDR representation respectively, wherein the first and second CDFs associate each codeword with a corresponding CDF value; and
        applying a cumulative distribution function matching based on the first and the second CDFs, comprising matching each codeword of the first CDF to a codeword of the second CDF that has a CDF value that matches the CDF value of said codeword of the first CDF, wherein the codewords of the first CDF define the input codewords of the first mapping function and the matched codewords of the second CDF define the output codewords of the first mapping function;
    determining the backward reshaping function based on the first mapping function; and
    generating the single channel prediction metadata representative of the backward reshaping function.

3. The method of claim 1, wherein the pre-reshaping function for a luma channel of the SDR representation comprises a first transformation and the pre-reshaping function for a chroma channel of the SDR representation comprises a second transformation, wherein the second transformation is a different transformation than the first transformation.

4. The method of claim 1, further comprising converting the SDR representation and the HDR representation into a predetermined color space.

5. The method of claim 4, wherein the predetermined color space is the IPT color space or the $IC_TC_P$ color space.

6. The method of claim 1, wherein the single channel prediction metadata comprises a one-dimensional lookup table for each color channel of a multi-channel color space mapping SDR image content to predicted HDR image content for the respective color channel.

7. The method of claim 6, wherein the one-dimensional lookup table is represented by an 8-piece second order polynomial such that three coefficients of the second order polynomial in each piece are used to approximate the mapping of the one-dimensional lookup table.

8. The method of claim 1, further comprising applying a color space transformation to adjust colors of image frames.

9. The method of claim 8, wherein the color space transformation is applied to the at least one color channel of the SDR representation before applying the pre-reshaping function to the at least one color channel of the SDR representation.

10. The method of claim 8, wherein the color space transformation is applied to at least one backward-reshaped pre-reshaped color channel to estimate the corresponding color channel of the HDR representation.

11. The method of claim 10, further comprising determining the parameters of the color space transformation by minimizing a cost function of a distance between pixels of the HDR representation and corresponding pixels of the estimated HDR representation for each of the color channels.

12. A non-transitory machine readable medium storing instructions which when executed by a data processing system cause the system to perform a method as in claim 1.

13. A data processing system which includes a memory and a processor configured to perform a method as in claim 1.

* * * * *